Figure 3:
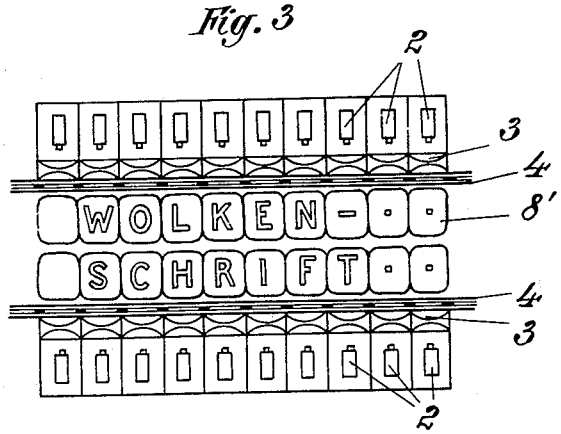

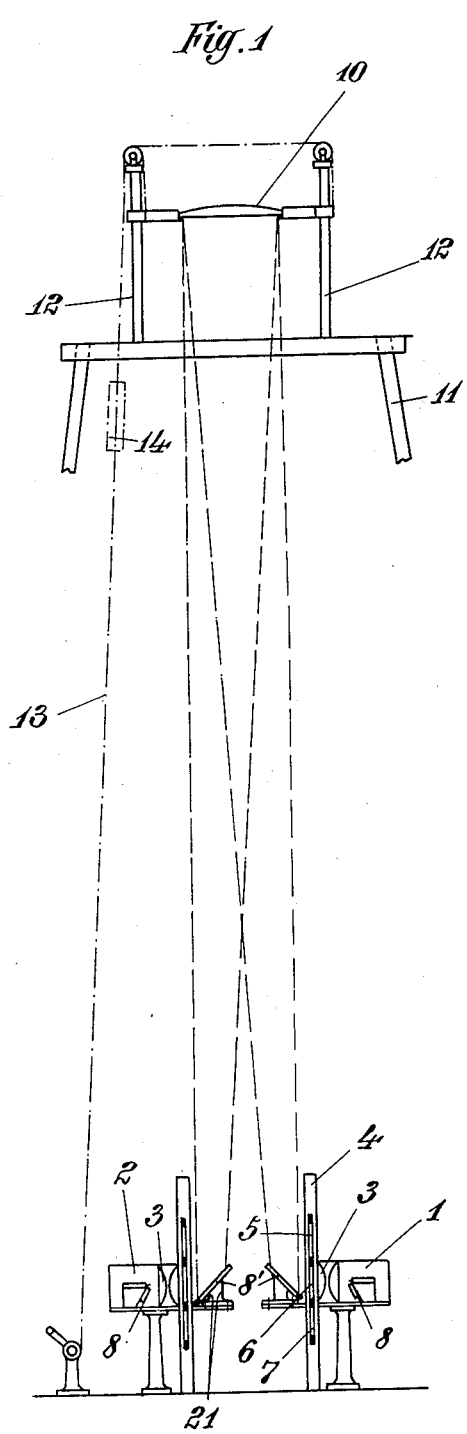
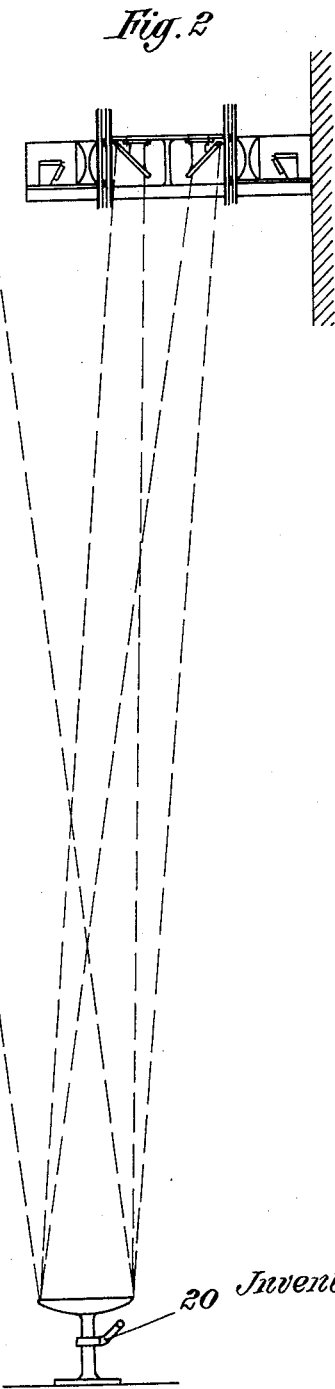

Patented Oct. 24, 1933

1,931,825

UNITED STATES PATENT OFFICE 1,931,825

APPARATUS FOR PROJECTING ADVERTISEMENTS AND THE LIKE

Paul Müller, Berlin-Friedrichshagen, Germany

Application June 30, 1931, Serial No. 548,008, and in Germany July 26, 1930

3 Claims. (Cl. 88—24)

The invention relates to apparatus for the projection of advertisements and the like. Apparatus of this kind are already known by means of which small advertising signs can be projected at great distance onto advertising surfaces especially mounted for this purpose or onto the clouds. The object of the invention is to permit of scripts and full words or large pictures to be projected satisfactorily at great distance, to which end a plurality of sources of light are provided according to the invention each of which sources of light is fitted with a condensing system. All these sources of light with their condensers, which units in the following are called the "projectors", co-operate with a common objective lens of a great focal length.

The invention further provides to not project the script or picture immediately through a lens but to a concave mirror which in turn reflects the rays received.

Figure 4:
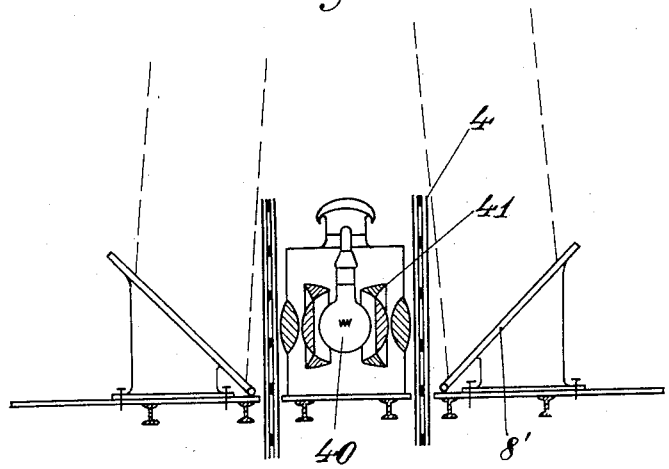

In order that the invention may be clearly understood and readily carried into effect, three embodiments of the same are diagrammatically illustrated by way of example in the drawings which accompany and form part of this specification. In these drawings:

Figure 1 is an elevation of the projecting apparatus forming the first embodiment, Figure 2 is a similar elevation of the second embodiment, Figure 3 is a top view on enlarged scale of a detail of the apparatus shown in Figures 1 and 2, and Figure 4 is an elevation of the parts constituting the third embodiment of the invention.

Referring first to Figure 1, by 1 and 2 are denoted two series of juxtaposed "projectors", each unit consisting of a source of light and an appurtenant condensing system, as mentioned above. 8 denotes the source of light and 3 the respective condensing system. By 4 is denoted a frame which serves to insert and hold in position the patterns of the words or the like to be projected, three sets of patterns 5, 6, 7 being provided in the embodiment illustrated in Figure 1. In this way according to which set of patterns is inserted into the projector, various rows of signs, words or the like can be projected.

Instead of the vertical motion provided of the patterns also a horizontal motion may be provided so that the advertisement executes a motion like the well known moving script.

The light rays emitted by the individual projectors pass through a common objective 10 having a great focal length and advantageously mounted on a building or a pole specially erected for this purpose. In the embodiment illustrated in Figure 1 the pole is denoted by 11. The lens 10 must be adjustable in order to be adjusted for the various distances the clouds or receiving surfaces may be separated from the apparatus. This adjustment may be made by the lens being vertically movably suspended in a frame from two ropes 13, 13 or the like, the frame being guided on two bars 12, 12, as clearly seen from the drawings. To compensate for the weight of the lens, etc., a counter-weight 14 is provided.

In the embodiment illustrated in Figure 2 a concave mirror is provided in lieu of the objective lens 10 of Figure 1, which mirror reflects the rays received to the clouds or advertising surface. This arrangement permits the location of the projectors with the appurtenant pattern sets at an elevated place, as illustrated in Figure 2 where they are mounted for instance on a wall of a building. The reflector is pivotally mounted on a pedestal 20.

Figure 3 is a view on enlarged scale, from above of the two series of projectors shown in Figure 1, or a view from below to those of Figure 2, the sources of light being denoted by 2 and the appurtenant condensers by 3. The patterns can be moved in their frames 4. Each unit 2, 3 has allotted to it a special reflecting mirror 8'.

The provision of individual reflecting mirrors is to be preferred to a common reflecting mirror for the entire respective series of units, as it enables adjustment of each individual mirror in order to exactly point the rays emitted by it to the objective lens. This adjustment is indicated at 21 in Figure 1. If the entire projecting system would be arranged horizontally, a big plane mirror would have to be disposed in front of the objective lens instead of the individual reflecting mirrors which mirror would be very costly and could be manufactured with difficulty for the necessary accuracy.

In the third embodiment illustrated in Figure 4 only one single source of light 40 is provided the rays of which are used on two sides, the one lens 41 of the projector advantageously being fitted with a catadioptic ring in order to obtain a better collection of the rays of light emitted by the lamp 40. 8' denotes the reflecting mirror and 4 the frame for the patterns to be projected.

The projecting apparatus according to the invention is not confined to the arrangement of the individual characters, words or the like in series; on the contrary, these may be arranged in such a manner that the individual images do not appear in lines but cover great surfaces and form combined images which if desired may be colored.

What I claim as my invention is:—

1. An apparatus for projecting pictures, words, letters, etc., on clouds and other distant surfaces, comprising a plurality of elements arranged side by side composing the configuration to be projected on the clouds, an individual source of light for each element, and a common lens through which all the light rays pass from the individually illuminated elements.

2. An apparatus according to claim 1, in which a condensing system is provided between each source of light and its respective element.

3. Apparatus for projecting pictures, letters, and the like, comprising a picture to be projected, subdivided into area elements, an individual light source for illuminating each area element, a lens common to all of the sources of light, and means for projecting the separately illuminated area elements through the common lens, each area element being as large as possible and the separate picture areas appearing on the projection surface alongside each other.

PAUL MÜLLER.